March 31, 1970  E. VOLPE  3,503,861
APPARATUS FOR ELECTROCHEMICAL ANALYSES
Filed March 16, 1967  2 Sheets-Sheet 1
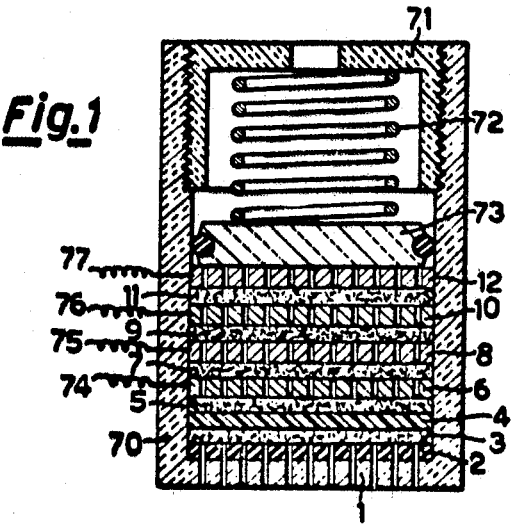
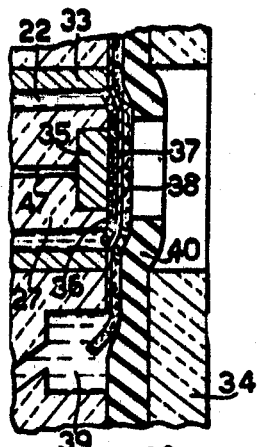
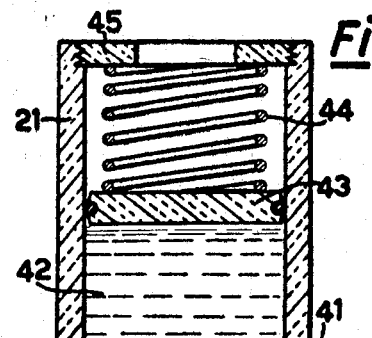
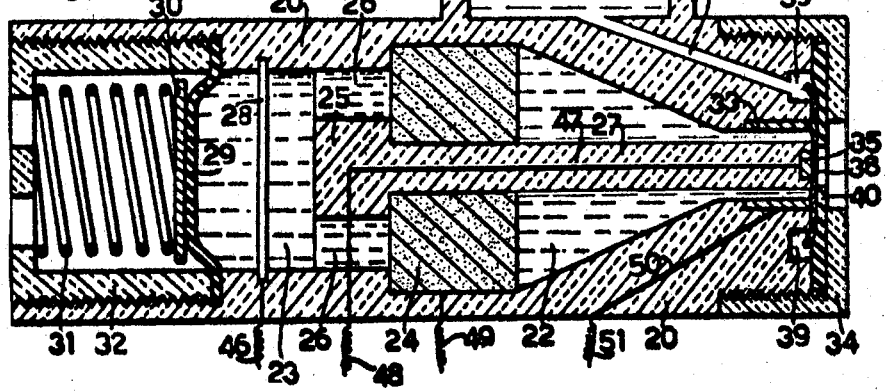
INVENTOR
EMILIO VOLPE
BY
ATTORNEY March 31, 1970  E. VOLPE  3,503,861
APPARATUS FOR ELECTROCHEMICAL ANALYSES
Filed March 16, 1967  2 Sheets-Sheet 2

INVENTOR.
EMILIO VOLPE
BY
Paul M. Craig Jr.
ATTORNEY

United States Patent Office

3,503,861
Patented Mar. 31, 1970

3,503,861
APPARATUS FOR ELECTROCHEMICAL
ANALYSES
Emilio Volpe, Viale Caldara 15, Milan, Italy
Filed Mar. 16, 1967, Ser. No. 623,641
Claims priority, application Italy, Mar. 21, 1966,
6,321/66
Int. Cl. B01k 3/10
U.S. Cl. 204—195                                    13 Claims

ABSTRACT OF THE DISCLOSURE

Apparatus for electrochemical analyses, particularly polarographic cell, which comprises in a closed container at least a measurement electrode near a diffusion diaphragm and a reference electrode fixedly spaced. The container is filled with an electrolyte and there are provided means for pressurizing said electrolyte. The container can be also provided with a guard electrode and a regeneration electrode, all the said electrodes being electrically connected to a measurement circuit.

---

This invention relates to an apparatus for electrochemical analyses.

More particularly, this invention has for its subject matter an apparatus for electrochemical analysis consisting of a polarographic cell especially suitable for continuous analysis.

An apparatus of the kind referred to permits that an analysis be made of a substance contained in a liquid, solid or gaseous medium, by detecting the effect of said substance on the electrical properties of the polarographic cell which forms the apparatus.

A polarographic cell, in its simplest embodiment, is a system consisting of an anode and a cathode (the one called the measuring electrode, the other the reference electrode) which are externally connected to an electric circuit and internally connected through an electrolytic bridge formed by a base solvent and a solute which gives ions that react on the surface of either electrode or of both electrodes with the substance to be measured, thus varying the electric characteristics of the polarographic cell. The problem of causing the substance under examination to react without polluting the electrolyte or varying the properties of the electrode surfaces has been solved in part (see U.S. patent specification No. 2,913,386) by separating the electrolyte and the cell electrodes from the medium which contains the substance to be examined through a selective barrier which allows only the substance to be examined to pass therethrough. In practice, such a barrier is embodied by a semipermeable diaphragm through which the substance to be examined is diffused. The problem of minimizing the response time of the measuring system imposes, since the reaction takes place only when the substance to be examined has reached the electrode surface on which it reacts, the adoption of a thin diaphragm which is very near to the surface of the reaction electrode and is separated therefrom by a thin electrolyte film.

An apparatus of this conventional kind has shortcomings mainly due to a certain instability of the measurements so that a new calibration of the assembly is imperative after a certain period of time.

Said instability of measurement in apparatus for the measure of gases in gaseous-phase systems is mainly due to the fact that, concurrently with the diffusion of the gas to be measured from the outside towards the inside of the cell, a diffusion in the reverse direction of electrolyte vapours take place and these cause a decrease of the electrolyte volume and a variation of the composition of the remaining electrolyte. This fact involves in the usual cells the ingress of gas with formation of bubbles which modify the operability of the cell, even causing breakages of the diaphragms if the external pressure undergoes considerable variations.

Even when this phenomenon does not occur, bubbles are none-the-less formed within the cell; both due to side reactions which produce very minute amounts of gas and due to decompression phenomena which produce the growth of bubble nuclei under supersaturation conditions.

The object of this invention is to reduce both the causes of temporary and permanent instability so as to enable the electrodes to be used for very long times without any necessity of calibration or maintenance operations. More particularly, such an instrument will be stabilized for measurements of gases in gaseous phase under a variable pressure where, due to the evaporation of the electrolyte through the diffusion diaphragm and the intake of undesirable gases therethrough, the instability of the cell is at a maximum.

To achieve this object, the invention provides for pressurizing the inside of the subject polarographic cell. Said pressurization does away with many sources of instability of such cells and can be obtained with a spring which urges, through a diaphragm, the electrolyte. The utility of this supplementary diaphragm is unfolded also in that it allows a greater balancing surface between the internal and the external pressures, this fact being particularly useful when the instrument is used in an environment in which considerable pressure variations are experienced. If the pressure-balancing area is all concentrated on the thin diffusion diaphragm, the volume variations of the electrolyte, as small as they may be, are all operative on the most sensitive portion of the instrument, thus causing its characteristics to be varied.

If the circuit is pressurized with a spring, it can be useful to prevent the formation of pressure waves caused by vibration of the spring, by inserting a suitable vibration-damping system. A possible solution is at hand by inserting a porous diaphragm between the measuring electrode and the spring.

Another source of instability is due to the fact that after a certain time of use it cannot be avoided that the surface of the electrodes change its properties and the electrolyte composition is modified. The electrode surface can change its properties due to absorption phenomena induced also by surface electrochemical reactions, or due to the formation on the surface of insoluble substances or also due to undesirable electrodeposits of ions contained in the electrolyte or formed therein. The electrolyte degenerates both due to the accumulation of possible reaction products and to the absorption, with or without reaction, of foreign substances coming from outside, or due to the exhaustion of active ionic species contained in the electrolyte.

Irreversible phenomena occur sometimes which cannot be remedied, but, in the general cases, reversible phenomena are involved and by reversing the electric polarity the initial conditions can be partially restored. For example, when measuring oxygen with cathodes of Ag, Au or Pt and anodes of Cd or Pb and a KOH-based electrolyte, oxides and hydroxides are formed at the anode, whereas on the cathode metal impurity atoms are deposited. By reversing the polarity, the oxides or hydroxides set free the metal on one electrode and oxygen on the other one, so that the impurities deposited on the cathode are redissolved. This reversal can take place between the two electrodes, i.e. the measuring and the reference electrode, respectively, but it can also take place between said electrodes and other, auxiliary electrodes.

According to the present invention, it has been ascertained that it is preferable that said regeneration is caused to occur between the reference electrode and another, specially provided, regeneration electrode because, as a general rule, is mainly the reference electrode which is converted during the use of the apparatus so that it requires the restoration of the original characteristics. On the other hand, should the measurement electrode be used as a regeneration electrode, it would undergo new and different pollutions.

Another source of instability is due to the substance to be examined which, without reacting on the measurement electrode, penetrates the inside of the cell and if the concentration of the substance at the outside is decreased, tends to return to the outside and thus on the measuring electrode, thus giving rise to a spurious signal. Still another source of instability is due to impurities possibly contained and/or formed in the electrolytic solution and which could pollute the measurement electrode, once they arrive thereat.

The last mentioned sources of instability could be reduced according to the invention by providing for an additional electrode, called the guard electrode, whose potential is determined by the position and the substance to be measured. The guard electrode is preferably made of a material having an electrochemical potential which is equal, or near, to that of the measurement electrode.

The present invention will now be described with reference to exemplary embodiments thereof reported by way of illustration only and without any limitation, the specification being aided by the accompanying drawings, wherein:

FIG. 1 is a diagrammatical sectional view of the layers forming a measurement cell according to the invention.

FIG. 2 is a view in section which shows a typical polarographic cell for the measurement of oxygen in an environment in which the ambient pressure is sharply variable.

FIG. 3 is a close up of FIG. 2.

Figure 4:
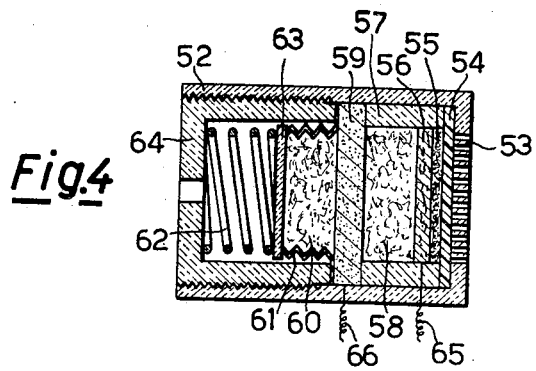
FIG. 4 is a sectional view of another embodiment of the inventive polarographic cell.

With reference to FIG. 1, the cell shown consists of a cylindrical container 70 of an insulating material, having a front wall 1 such as to permit the passage of the substance to be measured. A rear plug 71 closes the container and holds a spring 72 biasing a sealtight plunger 73 which, in turn, keeps the inner layers of the cell under pressure.

The layer 2 is a tightness gasket. Both the layers 1 and 2 should allow the passage of the substance to be measured towards the inside of the cell. They are perforated to this end.

The layer 3 above the diffusion diaphragm 4, is a layer which shields the inside of the cell by preventing the ingress of particular undesirable substances but prevents, above all, the seeping of electrolyte components, more particularly the solvent therefor, from the cell. The layer 3 can be formed by a diaphragm for example of an absorbent material, resting upon the layer 2 so as to hold a liquid film, for example the pure solvent for the electrolyte.

The diaphragm 4 separates the inner portions of the cell from the parts which are outside the diaphragm aforementioned, but permitting the flow by diffusion of the substance which is to react within the cell. The layers 5, 7, 9, 11 are layers of an electrolyte hold in an absorbent material.

The reference 6 indicates the measurement electrode which consists of a foraminous conductor. On the surface of this electrode the substance to be examined reacts, to give the electric signal which is necessary for the measurement.

The reference 8 indicates the guard electrode which reacts with that portion of the substance to be examined which has not reacted on the electrode 6 and reacts with those substances or ions which come from the innermost layer and which otherwise would react of the electrode 6 causing the electric characteristics thereof to be varied and thus giving a spurious electric signal. This guard electrode 8 is embodied by a foraminous conductor.

The numeral 10 indicates the reference electrode consisting of a foraminous conductor material. The numeral 12 represents the regeneration electrode. During the normal operation of the cell, its potential can be useful for producing, on the face of the electrode 10 which confronts the electrode 12, the reaction which is the reversal of the one which takes place on the opposite face of the electrode 10. A certain regeneration of the electrolyte thus takes place and also of the reference electrode 10 which will occur only if the electrode 10 divides the electrolyte into two parts and only if the species which are formed on a face are conveyed onto the other face, for example by diffusion through the electrode. The regeneration can be a thorough one if the operation of the measurement electrode is discontinued and if a proper potential is applied between the electrodes 10 and 12. The potentials in question are intended as supplied not only by external sources of E.M.F. but also by the E.M.F. of oxidation and reduction of same electrodes.

The reference characters 74, 75, 76 and 77 indicate the wires which connect the electrodes to the measurement circuit.

FIG. 2 is a central sectional view of an exemplary embodiment of a polarographic cell adapted to the measurement of oxygen in a gaseous environment, the external pressure of which is strongly variable. The assembly comprises two hollow cylindrical bodies 20 and 21 solid with one another, which form the cell casing, made of an insulating material.

In the interior of the body 20 there are two chambers 22 and 23 containing the electrolyte and separated from one another by the reference electrode 24, embodied by sintered lead or cadmium so as to retain a porous state, and by the member 25, equipped with the conduits 26 and from which the cylindrical support 27 projects.

The chambers 22 and 23, though distinct, communicate through the holes 26 and the pores of the electrode 24. In the chamber 23 there is the regeneration electrode 28 formed by a platinum, gold or silver wire. The electrolyte contained in the chamber 23 is kept under pressure by a diaphragm 29 thrust by a disc 30 on which a spring 31, held by a bored cap 32 screwed onto the body 20, is caused to urge.

The chamber 22 is shrunk towards the right as viewed in FIG. 3 and at this point is inserted through its wall, in the form of a pipe shank, the guard electrode 33, whose shape and position are particularly suitable for controlling the confronting narrow annular duct.

The right end (as viewed in FIG. 2) of the cell and its parts, affixed with a lid 34 screwed onto the body 20, are shown in more detail in FIG. 3. At the end of the support 27 is inserted the measurement electrode 35 in the form of a small disc and this is made, as is the electrode 33, of silver or gold. On the end of the support 27 rests a disc 36 of an absorbent material, whose edge dips into the electrolyte bath contained in the chamber 22. The task of the disc 36 is to maintain an exact space relationship between the electrode 35 and the diffusion diaphragm 37. If, however, it is desired to shorten the reaction times of the cell, the disc 36 can be dispensed with.

The diffusion diaphragm 37, generally only a few microns thick, is covered by a film 38 of an absorbent material whose edge is terminated at a circular channel 39 from which water, held under pressure, penetrates the diaphragm 38. A gasket 40, pressed by the lid 34, locks the disc 36 and the diaphragms 37 and 38, while simultaneously providing the necessary sealtightness both for the water contained in the channel 39 and the electrolyte contained in the chamber 22.

The circular channel 39 is connected, by a thin duct 41, to a chamber 42 which contains water kept under pressure by a piston 43 biased by a spring 44, the latter being stopped by a screwed plug 45. The spring 44 and the spring 31 are held within a headroom which is put in communication with the atmosphere by perforations formed through their respective lids.

The numerals 46, 47, 48, 49, 50 and 51 connote internal connection and external connection wires for their respective electrodes.

The electrolyte can be a 24% aqueous solution of KOH. Oxygen seeping through the diaphragms 38, 37 and disc 36 reacts on the measurement electrode 35, maintained at a negative potential by E.M.F. of electrodes 35 and 24 and by an external E.M.F. which maintains the electrode 35 at minus 0.51 volts with respect to the electrode 24, to produce OH$^-$ ions and O$_2$H$^-$ ions. The metallic anode 24 reacts with the OH$^-$ ions giving, as a rule, hydroxides which are passed in solution to enrich the electrolyte with metallic cations.

In the regeneration stage, the regeneration electrode 28 takes up a positive potential (from 0.5 to 0.9 volt) with respect to the electrode 24 so that oxygen evolution will be experienced on the former and deposition of the metal which had been consumed, on the latter.

FIG. 4 shows a measurement cell embodied by a tiny capsule. The numeral 52 indicates the container, 53 the front wall thereof, which is densely foraminous, 54 is the diffusion diaphragm, 55 is an electrolyte-soaked porous diaphragm, 56 is the measurement electrode embodied by a thin and closely knit silver gaze, 57 is a ring which provides sealtightness on the diaphragm 54, 58 is an electrolyte-soaked porous material which holds in position the electrode 56 and the diaphragm 55, 59 is the reference electrode of porous sintered lead, 60 is a headroom which contains the electrolyte (KOH solution), 61 is a diaphragm biased by a spring 62 with the intermediary of a disc 63, 64 is a cap screwed onto the container 52 and presses the edge of the diaphragm 61 on the electrode 59 and thrusts with its centrally bored bottom the spring 62.

The numerals 65 and 66 indicate the external connection wires from the electrodes to the measurement circuit. The operation of the cell now described is similar to that of the cell described in the foregoing.

Figure 5:
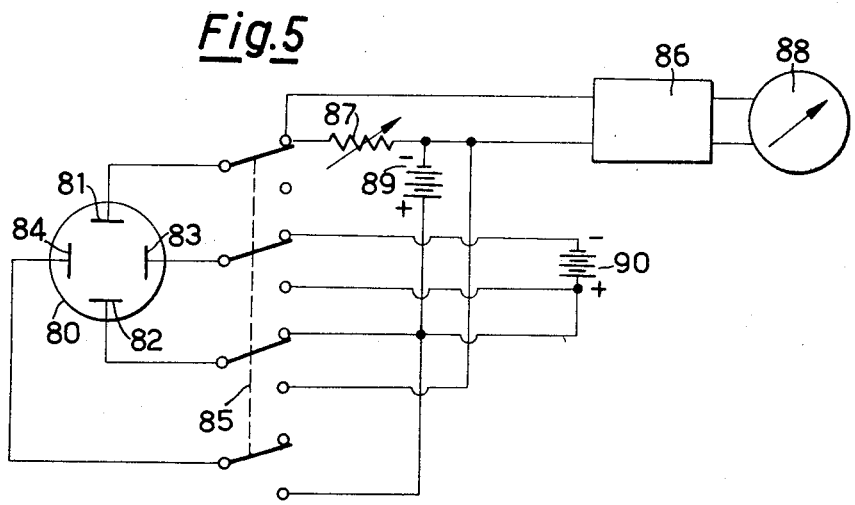
FIG. 5 is a wiring diagram of a possible measurement circuitry which can be used for the polarographic cells according to FIGS. 1 and 2.

FIG. 5 is an exemplary description of a wiring diagram of a measurement circuitry which can be employed for the polarographic cells described in connection with FIGS. 1 and 2.

In this diagram, the cell is symbolically indicated at 80. In the cell there are the measurement electrode 81, the reference electrode 82, the guard electrode 83 and the regeneration electrode 84. These four electrodes are connected to the four movable contacts of a two-way switch indicated at 85. In FIG. 5, the switch is shown in its measurement position, whereas the alternative position is the cell-regeneration position. In the measurement circuit which is completed from the measurement electrode 81 to the reference electrode 82 through the electrolyte contained in the cell 80, is inserted a differential amplifier, symbolically indicated by the block 86, with a variable resistor 87 connected in parallel for adjusting the sensitivity, the reading instrument 88 and a D.C. power source 89, for example a dry cell or the like, capable of generating a potential of 0.51 volt.

In the circuit which, in the measurement position of switch 85, is completed on the reference electrode 82 and the guard electrode 83 is inserted, in addition, a D.C. power source 90 which generates a voltage in the neighbourhood of 0.45 volt and whose positive leg is connected to the positive leg of the source 89.

Passing the switch 85 from the measurement position to the regeneration position, the potential is reversed on the electrodes 82 and 83, and the electrode 84 is connected to the positive legs of the voltage sources 89 and 90.

During progress of measurement, for example of oxygen, the latter quantitatively reacts on the measurement electrode 81 generating a current which is proportional to its concentration. This current is amplified by the amplifier 86 and is indicated by the meter 88.

Figure 6:
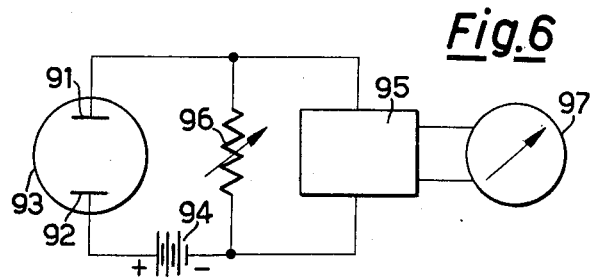
FIG. 6 is the wiring diagram of a measurement circuitry which can be used for the cell according to FIG. 4.

FIG. 6 shows the wiring diagram of a measurement circuit which is adapted to the cell of FIG. 4. This circuit virtually corresponds to the one described in the foregoing, but for the lack of the guard and regeneration electrodes. More particularly, there is a measurement electrode 91, a reference electrode 92 (both electrodes in the interior of a cell diagrammatically indicated at 93) and connected to the circuit which comprises the D.C. power source 94, the amplifier 95 with the variable resistor 96 connected in parallel and the meter 97.

The operation of the latter circuit is similar to that of the circuit described above.

All the electrodes used in the inventive cell can be embodied by different metallic materials and in different shapes, such as, for example, porous slabs, grids, nets, wires and others.

The pressurization of the interior of the cell could be obtained with any other conventional means such as hydraulic or pneumatic systems.

While the present invention has been described with reference to a few exemplary embodiments thereof, it will be understood by those skilled in the art that many changes and modifications can be introduced therein without departing from the spirit and scope of said invention.

What is claimed is:

1. An apparatus for electrochemical analyses comprising a closed container;
   a diffusion diaphragm separating the interior of said container from the exterior thereof and selectively permitting the substance to be measured into the inside of said container;
   a measurement electrode placed in the interor of the container in the neighborhood of and at a first fixed distance from said diaphragm;
   a reference electrode arranged internally of the container at a second fixed distance from said measurement electrode, said second fixed distance being greater than said first fixed distance;
   an electrolyte filling the hollow space of said container;
   a measurement circuit electrically connected to said measurement and reference electrodes; said container including
   movable wall means disposed a distance greater than said second fixed distance from said diffusion diaphragm, said measurement and reference electrodes being disposed between said movable wall means and said diffusion diaphragm; and
   means disposed exterior to said movable wall means for applying a force thereon tending to urge said movable walls means towards said diffusion diaphragm, thereby pressurizing the electrolyte in the interior of the closed container.

2. An apparatus according to claim 1 wherein the means for applying a force on said movable wall means comprises
   a pressurized fluid acting from the outside upon said wall means.

3. An apparatus according to claim 1, wherein said movable wall means consists of a thin flexible diaphragm upon which a spring rests from the outside with the intermediary of a disc.

4. An apparatus according to claim 1, wherein the hollow space of the container in which the electrolyte is held is partitioned by at least one diaphragm which is previous to said electrolyte and which is disposed between said diffusion diaphragm and said movable wall means.

5. An apparatus according to claim 1, wherein an auxiliary diaphragm is supported in pressing engagement with said diffusion diaphragm, said auxiliary diaphragm being soaked with a liquid adapted to impede the evaporation of the electrolyte.

6. An apparatus according to claim 5, wherein a reservoir containing said liquid is attached to said container and wherein commuication channels are provided between said reservoir and said auxiliary diaphragm to feed said liquid thereto.

7. An apparatus according to claim 1, wherein a guard electrode adapted to react with the substances which did not react on said measurement electrode and with substances which could impair the operation thereof is disposed in said container.

8. An apparatus according to claim 7, characterized in that the guard electrode is placed between the measurement electrode and the reference electrode.

9. An apparatus according to claim 7, characterized in that the guard electrode is tubular and partially surrounds the measurement electrode.

10. An apparatus according to claim 1, wherein a regeneration electrode is arranged between said reference electrode and said movable wall means.

11. An apparatus according to claim 10, characterized in that means are provided for reversing the polarity of the reference electrode with respect to its polarity during the measuring step and for applying to the regeneration electrode a potential having the same polarity as the reference electrode during the measurement step.

12. An apparatus according to claim 1, wherein said reference electrode is made of a porous metallic article.

13. An apparatus according to claim 1, wherein a regeneration electrode is disposed in said container between said movable wall means and said reference electrode, and wherein said reference electrode comprises a porous member which divides the hollow space in said container into a regeneration section bounded by said regeneration electrode and said reference electrode and a measurement section bounded by said measurement electrode and said reference electrode, whereby the variation in the concentration of the electrolyte in said measurement section during sample measurement causes a diffusion of the electrolyte through said reference electrode and into said regeneration section and a simultaneous regenerative electrochemical action between said reference electrode and said regeneration electrode.

References Cited

UNITED STATES PATENTS

| | | | |
|---|---|---|---|
| 2,805,191 | 9/1957 | Hersch | 204—195 |
| 3,028,317 | 4/1962 | Wilson et al. | 204—195 |
| 3,227,643 | 1/1966 | Okun et al. | 204—195 |
| 3,260,656 | 7/1966 | Ross | 204—1.1 |
| 3,328,277 | 6/1967 | Solomons et al. | 204—195 |
| 3,380,905 | 4/1968 | Clark | 204—195 |
| 3,410,778 | 11/1968 | Krasberg | 204—195 |
| 3,410,779 | 11/1968 | Whitehead et al. | 204—195 |

T. TUNG, Primary Examiner